May 6, 1924.

H. K. ANGSTRÖM 1,493,416

THRUST BEARING

Filed June 20, 1921    2 Sheets-Sheet 1

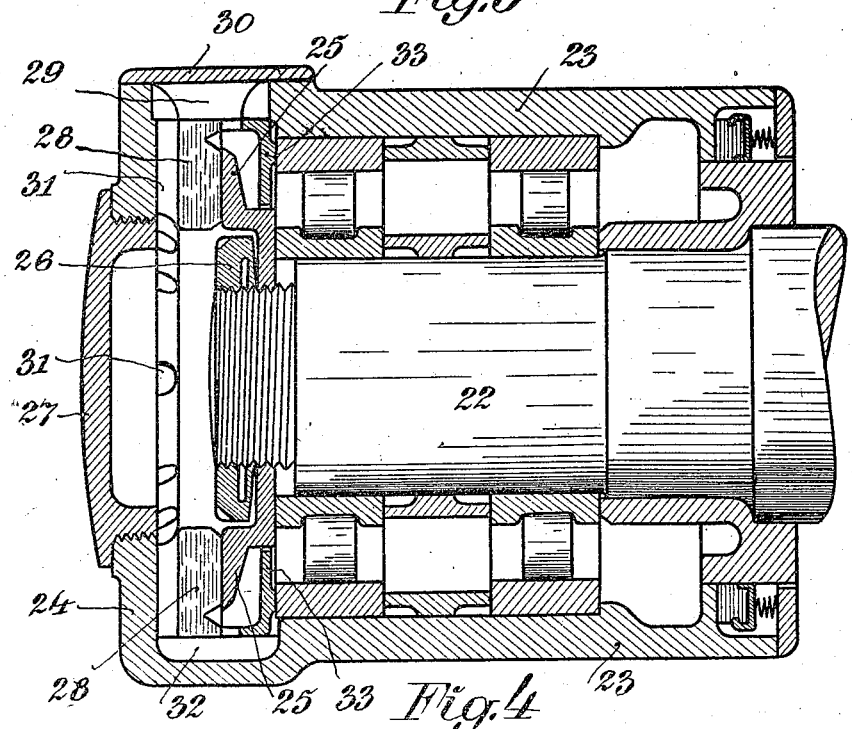
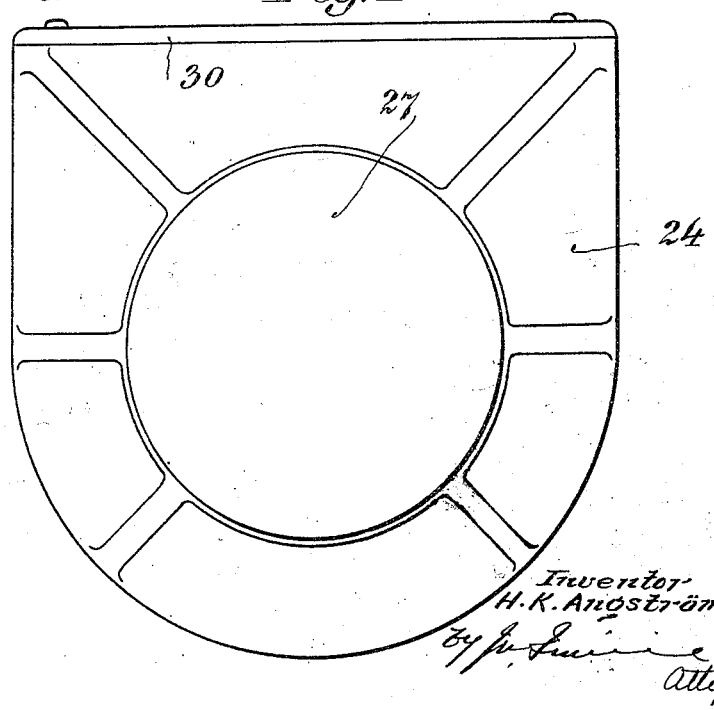

Patented May 6, 1924.

1,493,416

UNITED STATES PATENT OFFICE.

HILDING KNUTSSON ÅNGSTRÖM, OF MALMO, SWEDEN.

THRUST BEARING.

Application filed June 20, 1921. Serial No. 479,053.

*To all whom it may concern:*

Be it known that I, HILDING KNUTSSON ÅNGSTRÖM, a citizen of Sweden, and residing at Malmo, in the county of Malmohus, Kingdom of Sweden, have invented a new and useful Improvement in Thrust Bearings (for which I have filed applications in Sweden March 31, 1919, and June 16, 1920), of which the following is a specification.

It is rather difficult to use roller or ball bearings in vehicles such as tramcars, railway cars, locomotives and the like on account of the heavy axial stresses or thrust arising during the passage of curves and switches, &c., and the invention refers to improved means for avoiding this difficulty, for which purpose a disc-shaped spring is arranged within the journal box in the manner described below. The general idea of the invention is to arrange said disc-shaped spring or plate, which at the edges may be provided with radially extending slots or recesses, between the end of the shaft and the outer wall or cover of the journal box in such a manner that the shaft end rests against the centre part of the disc and the edges of the disc against the circumferential parts of the box cover, thereby permitting a lighter construction of the latter than would be the case if the thrust of the shaft should be taken up by the central part of the same.

Figure 1:
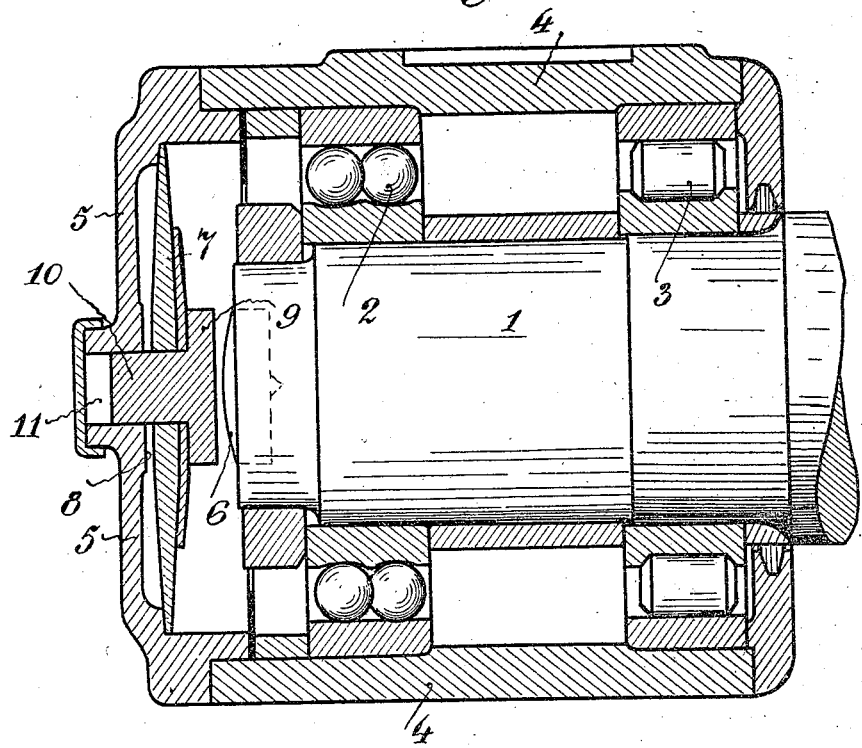
Figure 2:
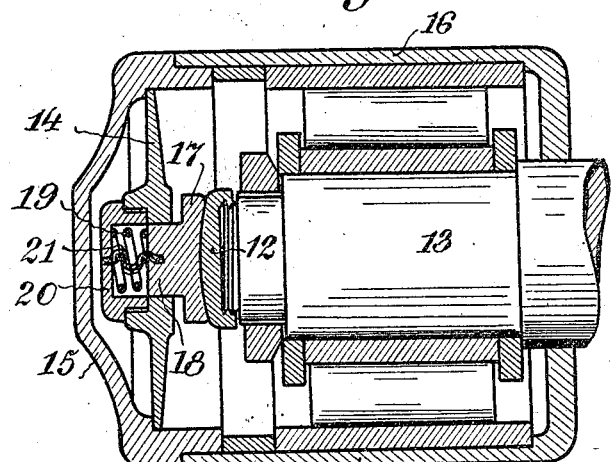

The invention is illustrated in the accompanying drawings, in which Figs. 1 and 2 show two embodiments thereof in longitudinal section through the journal box. Fig. 3 shows in the same manner a third embodiment of the invention and Fig. 4 is an end view of the journal box belonging to the same.

It is a matter of indifference whether the shaft is journalled within roller or ball bearings of one kind or the other as long as it is permitted to slide freely in an axial direction without transmitting any axially directed stresses to the bearings, which are intended to take up radial stresses only, the rollers or balls being liable to be crushed or otherwise damaged if acted upon axially.

According to Fig. 1 the shaft 1 is journalled in bearings 2 and 3 located within the journal box 4, the outer end of which is closed by means of a cover 5. The end of the shaft is carried out in the form of, or provided with, a buffer 6 having preferably a ball-shaped striking surface, so as to act in the same manner even when the shaft is slightly inclined in relation to the axis of the journal box. Within the said journal box a strong disc-shaped metal spring 7 is provided, the edges of which rest against an abutment formed at the circumferential part of the inner side of the cover 5 as shown in the drawing, there being normally a space 8 between the central part of the outer surface of the spring-plate 7 and the corresponding part of the inner surface of the cover 5. Preferably the buffer 6 does not act directly upon the spring-plate but upon a head 9 provided at the central part of the same and releasably connected with the spring-plate, so that said plate easily may be exchanged if accidentally broken or otherwise damaged. The head 9 is provided with a pin 10 extending through a hole in the spring-plate into a bore 11 arranged at the centre of the box cover 5, said pin serving as a guide member for the head 9 and the spring-plate. Preferably there is normally a little space between the buffer 6 and the spring-plate, but said space may also be omitted.

In Fig. 2 the buffer 12 arranged at the outer end of the shaft 13 is given the form of a cap arranged upon the reduced shaft end and provided with a ball-shaped striking surface as described above. The spring-plate 14 is arranged in the same manner as in Fig. 1 so that its edges rest against the circumferential parts of the cover 15 closing the journal box 16. The head 17 is connected with a pin 18 intruding in and guided by a corresponding hole at the centre of the spring-plate 14. One end of a spring 19 rests against the outer end of the pin 18 and the other end of said spring rests against the inner bottom surface of a capsular member 20 affixed, for instance by means of threads, to the outer side of the spring-plate 14. Instead of the arrangement last described the outer end of the spring may rest directly against the box cover 15 or any member affixed thereto.

When using the construction described in tram-cars or the like driven by means of electricity transmitted to the earth partially by means of the car-body and the wheels the arrangement described may be used for shunting off the current from the bearings proper, which otherwise would easily be damaged because of galvanic actions occurring through the lubricant used, which never is absolutely free from acids. For this purpose the head 17 in one way or the other, for instance by means of the spring 19, is kept in constant contact with the buffer arranged at the end of the shaft irrespective of the axial movements of said shaft, and for obtaining a large contact surface the head 17 may be given a concave contact surface corresponding to the ball-shaped striking surface of the buffer. Besides the guide pin for the head may be connected with the spring-plate or any member affixed thereto by means of a flexible conducting wire as shown at 21 in Fig. 2. The said wire may, however, also be arranged between the head or pin and the box cover or any other part of the journal box.

The pins 11 or 18 are given a prismatical outer circumference or keyed to the corresponding spring-plates 8 or 14 so that they cannot rotate in the corresponding holes in the plates when acted upon torsionally by the shaft and in a corresponding manner the spring-plates 8 or 14 are prevented from rotating within the box.

According to Figs. 3 and 4 the arrangement is somewhat different, the spring-plate being affixed to and rotating together with the shaft and the edges of the same resting against a corresponding bearing surface arranged at the end of the journal box. In said figures the reference 22 designates the shaft, which is journalled within the box 23 having no detachable cover but being provided with a fixed end wall 24 carried out in one piece with the rest of the box. The spring plate 25 is affixed to the shaft by means of a nut 26 arranged upon the threaded end of the shaft, and a cap-shaped member 27 is detachably connected with the end wall 24 of the box for the purpose of removing the nut 26. The spring-plate 25 rests against an annular member 28, preferably consisting of fibre or any other slightly compressible material arranged between said spring-plate and the outer end wall 24 of the box, so that axial stresses in the same manner as described above are taken up by the circumferential parts of said end wall. For the purpose of inserting as well the parts 25 and 28 as other parts of the bearing, such as roller or ball races and the like, the outer end of the box is widened towards the upper surface as shown in Fig. 4 and provided with an opening 29 large enough for the insertion of the different parts, said opening being closed by a removable cover 30. The shaft itself is stepwise tapering towards the end, so that the journal box as well as the parts inserted therein may be removed from the shaft axially after the removal of the nut 26, which may be done through the opening in the end wall of the box.

On account of the larger radius of rotation and the comparatively higher peripheral speed according to the modification shown in Fig. 4 it seems as if the frictional resistance would be somewhat larger than in the other modifications, this, however, not being the case because of the better lubrication obtained. By the centrifugal action during the rotation of the spring-plate 25 the lubricant taken up by the same is positively thrown towards its outer edge and must intrude between the coacting surfaces of the spring plate 25 and the ring 28. When used between said surfaces the lubricant is further thrown outwardly and strikes the walls of the journal box, whereafter it flows down to the lower part of the box, from which it is again taken up by the rotating spring-plate and so on. As to permit this circulation of the lubricant the ring 28 at its outer surface, resting against the end wall of the box, is provided with radial channels 31, and the outer end of the box at its bottom is provided with a pocket 32 for collecting sludgy particles. For preventing such particles from intruding into the bearing proper an annular protection ring 33 is provided. By this arrangement the lubrication is greatly facilitated and in fact the difference between the frictional resistance according to the modification last described in comparison with the other modifications referred to is very slight, and in all of the modifications said resistance is of practically no influence with regard to the power required for driving the car.

As to the spring-plates themselves, they may be carried out in a large number of different ways. Thus they may consist of a plurality of circular or annular lamels of different diameters as shown in Fig. 1 or they may consist of a single plate gradually decreasing in thickness towards the edges as shown in Fig. 2. Either they are carried out in one way or the other they may be provided with radial slots or recesses so that their outer periphery forms a number of fingers or tongues resting against the circumferential part of the box cover or the end wall of the box. Further they may either rest against a hard surface, as shown in Figs. 1 and 2, or a surface which may be slightly compressed, as shown in Fig. 3. In any case they must be adapted for taking up heavy axial stresses without breaking or losing their flexibility.

Of course the modifications described above may be combined in one way or the other. Thus the boxes shown in Figs. 1 and 2 may be provided with fixed end walls as shown in Figs. 3 and 4 if simultaneously provided with means for removing the parts in conformity with the modification last referred to, and a spring may be inserted behind the pin 10 also in the modification shown in Fig. 1.

Having now described my invention and the manner, in which the same is to be performed, I declare that what I claim is:—

1. An end thrust compensator for a journal box, comprising a shaft end journaled within said box, a disc secured to said shaft end and rotating therewith, a slightly compressible element arranged in advance of the edge of said disc in the vicinity of the shaft end and intended for absorbing the outward thrust of the shaft end, and a rigid supporting face for the said compressible element arranged at the outer end wall of the journal box.

2. An end thrust compensator for a journal box, a shaft journaled in said box, a disc removably secured to said shaft, and a slightly compressible element arranged in advance of the edge of said disc and beyond the end of the shaft to absorb the end thrust of the shaft.

3. An end thrust compensator for a journal box, a shaft journaled in said box, a disc removably secured to said shaft, and a slightly compressible element arranged in advance of the edge of said disc, one face of said element being formed with channels.

In testimony whereof, I have signed my name to this specification in the presence of two subscribing witnesses.

HILDING KNUTSSON ÄNGSTRÖM.

Witnesses:
ERNEST PIERSON,
TREAFLSION.